United States Patent

Sugimoto

[11] Patent Number: 5,826,099
[45] Date of Patent: Oct. 20, 1998

[54] DATA PROCESSOR HAVING A COMPUTING ELEMENT MOUNTED ON A MICROCONTROLLER

[75] Inventor: Takashi Sugimoto, Kasugai, Japan

[73] Assignees: Fujitsu Limited, Kawasaki; Fujitsu VLSI Limited, Kasugai, both of Japan

[21] Appl. No.: 709,683

[22] Filed: Sep. 10, 1996

Related U.S. Application Data

[63] Continuation-in-part of Ser. No. 605,804, Feb. 23, 1996, which is a continuation of Ser. No. 207,031, Mar. 7, 1994, abandoned.

[30] Foreign Application Priority Data

Mar. 15, 1993 [JP] Japan ................................ 5-054341

[51] Int. Cl.⁶ ........................................................ G06F 13/00
[52] U.S. Cl. ...................................................... 395/800.32
[58] Field of Search ........................ 395/800.01, 800.16, 395/800.32, 376, 825, 845; 364/131–134, 736, 741

[56] References Cited

U.S. PATENT DOCUMENTS

| | | | |
|---|---|---|---|
| 4,272,828 | 6/1981 | Negi et al. | 364/900 |
| 4,682,302 | 7/1987 | Williams | 364/768 |
| 4,734,850 | 3/1988 | Torii et al. | 364/200 |
| 4,974,157 | 11/1990 | Winfield et al. | 364/200 |
| 5,121,351 | 6/1992 | Shirakawa et al. | 364/748 |

Primary Examiner—Alpesh M. Shah
Attorney, Agent, or Firm—Staas & Halsey

[57] ABSTRACT

A data processor including a data control unit having a computing portion, including a first storage unit for writing and reading a first set of data for supporting the computing portion, a second storage unit for writing and reading a second set of data for supporting the computing portion, and an arithmetic unit for calculating the first set of data read out of the first storage unit and the second set of data read out of the second storage unit and outputting result data. The data processor may instead include a data control unit having a computing portion, two or more support units for supporting the computing portion, each including a first storage unit for writing and reading a first set of data for supporting the computing portion, a second storage unit for writing and reading a second set of data for supporting the computing portion, and an arithmetic unit for calculating the first set of data read out of the first storage unit and the second set of data read out of the second storage unit and outputting result data, and a data change-over unit for transferring the resulting data outputted from the support unit to one of another one of the support units and the data control unit.

10 Claims, 10 Drawing Sheets

FIG. 9A

| "0" UPPER | "0" LOWER | ~ OREG |

"00000000"  "00000000"

|  | 15 | 14 | 13 | 12 | 11 | 10 | 9 | 8 |
|---|---|---|---|---|---|---|---|---|
| 000085H | OD15 | OD14 | OD13 | OD12 | OD11 | OD10 | OD09 | OD08 |
|  | R | R | R | R | R | R | R | R |

|  | 7 | 6 | 5 | 4 | 3 | 2 | 1 | 0 |
|---|---|---|---|---|---|---|---|---|
| 000084H | OD07 | OD06 | OD05 | OD04 | OD03 | OD02 | OD01 | OD00 |
|  | R | R | R | R | R | R | R | R |

FIG. 9B

~ AFCS

"00 — 0"

|  | 7 | 6 | 5 | 4 | 3 | 2 | 1 | 0 |
|---|---|---|---|---|---|---|---|---|
| 000086H | CIE | COVF | — | — | — | — | — | RCLR |
|  | R/W | R/W |  |  |  |  |  | R/W |

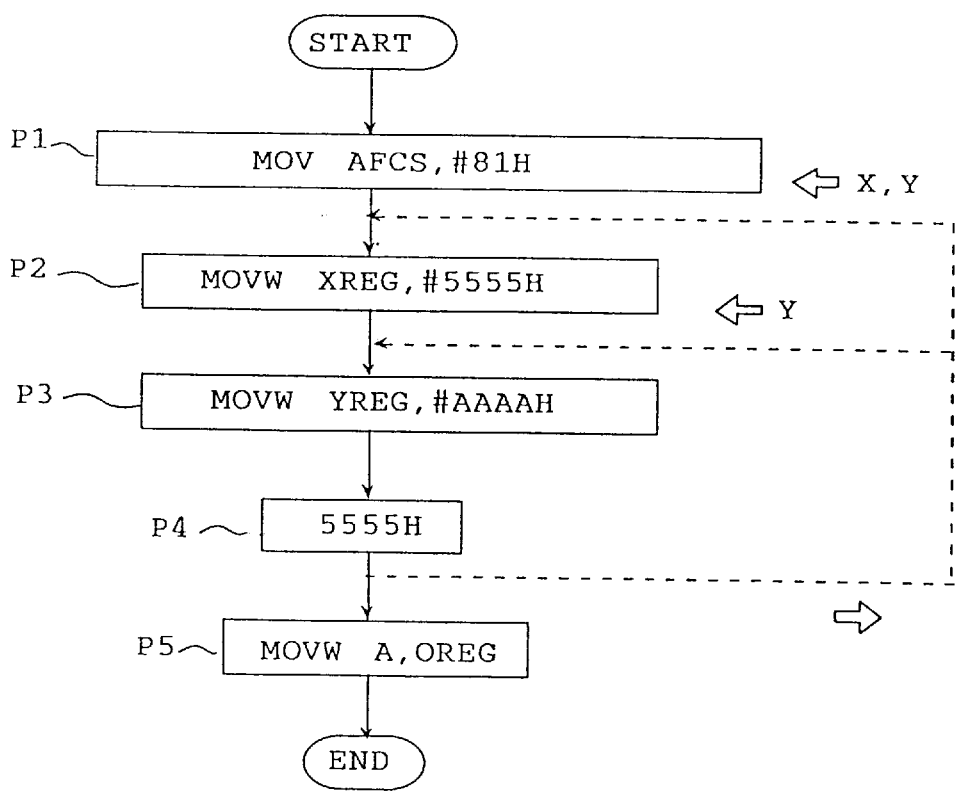

DATA PROCESSOR HAVING A COMPUTING ELEMENT MOUNTED ON A MICROCONTROLLER

This is a Continuation-in-Part of application Ser. No. 08/605,804 filed on Feb. 23, 1996, now pending, which is a Continuation of application Ser. No. 08/207,031 filed Mar. 7, 1994, now abandoned.

BACKGROUND OF THE INVENTION

1. Field of the Invention

The present invention relates to a unit provided with a computing element other than a computing element of a central processor unit (hereinafter referred to as a CPU) for executing various instructions and a method of processing data thereof.

2. Description of the Related Art

As to a use configuration of a microcontroller or the like for processing various information, priority has become to be given to a type of unit capable of executing high speed operation in recent years. Therefore, a tendency has been to adopt a method of mounting an exclusive computing element capable of high speed operation on a microcontroller rather than performing the operation with a CPU.

Here, the prior art of the present invention will be described. For example, a first data processor provided with a computing element other than the computing element of a CPU 1A includes a CPU 1A, a read-only memory (ROM) 2A, a general-use RAM (a memory capable of non-periodical write/read) 3A, a computing element 4A and a RAM 5 for operation data as shown in FIG. 1.

The function of the first data processor is such that, for example, a computing element contained in the CPU 1A executes the operation by a micro control program read out of the ROM 2A. At this time, the resulting data O of the operation executed successively are stored in the general-use RAM 3A. Further, the resulting data O of the operation are transferred to the RAM 5 so as to be computed by the computing element 4A which operates at a higher speed than the computing element contained in the CPU 1A. Thus, the computing element 4A reads out input data X and Y developed in the RAM 5 for operation data, and computes the input data X and Y.

The resulting data O of the operation are stored in the RAM 5 for operation data, and are read out by the CPU 1A. With this, the computing element 4A is charged with a burden of operation of the CPU 1A, thereby aimed at achievement of a higher speed of the operation.

Further, a second data processor provided with a computing element in addition to a computing element of a CPU 1B includes a CPU 1B, a ROM 2B, a general-use RAM 3B, a computing element 4B and a direct memory access controller (DMAC) 6 as shown in FIG. 2.

The function of the second data processor is such that, for example, a computing element contained in the CPU 1B executes the operation by a micro control program similarly to the first data processor. At this time, the resulting data of the operation executed successively are transferred to a general-use RAM 3B through the DMAC 6. Here, the resulting data O are read directly out of the general-use RAM 3B through the DMAC 6, and input data X and Y are transferred to the computing element 4B in order to have the computing element 4B which operates at a higher speed than the CPU 1B compute the data. Further, the input data X and Y are computed in the computing element 4B, and the resulting data O are written directly in the general-use RAM 3B through the DMAC 6. With this, the computing element 4B is charged with the burden of operation of the CPU 1B, similarly to the first data processor, thereby aimed at a higher speed of the operation.

SUMMARY OF THE INVENTION

It is an object of the present invention to perform the operation at a high speed by a limited circuit configuration even when a computation expression of a computing portion is complicated by devising an input circuit of data and a transfer method thereof without depending on a memory for operation data which becomes an exclusive data region of a computing element, a direct memory access controller for writing/reading the operation data and the resulting data directly into and from a memory or the like. In other words, the object is aimed at reducing of a circuit structure by making apparent execution time "zero," so that the total data processing time becomes data transfer time.

Namely, a data processor of the present invention is provided with data control means having a computing portion and support means for supporting the operation of the control means as shown in FIG. 3 with a preferred embodiment thereof. The support means includes a first storage means for writing and reading data on one side for supporting the computing portion, a second storage means for writing and reading the data on the other side for supporting the computing portion, arithmetic means for computing the data of the first storage means and the data of the second storage means and outputting the resulting data.

Another data processor of the present invention is provided with data control means having a computing portion, two or more support means for supporting the operation of the control means, and data change-over means for transferring the resulting data outputted from the support means to the other support means or the data control means.

A method of computing data of the present invention is a method for supporting the operation of the other arithmetic processing system, in which the data on one side required for the operation are inputted in a first write period, the data on the other side required for the operation are inputted in a second write period following the first write period, arithmetic action is started after a lower order byte of the data on the other side is inputted, and the computed resulting data are transferred in a read period following the second write period.

Further, according to the method of computing data of the present invention, the computed resulting data are used as the datum on one side required for the operation and are applied with pipeline processing independently of the other arithmetic processing system.

BRIEF DESCRIPTION OF THE DRAWINGS

FIG. 9A is an explanatory diagram of an operation result register (OREG) according to respective embodiments of the present invention;

FIG. 9B is an explanatory diagram of a control status register (AFCS) according to respective embodiments of the present invention;

FIG. 10B is an action flow chart of a supporting arithmetic unit according to the first preferred embodiment of the present invention.

DESCRIPTION OF THE PREFERRED EMBODIMENTS

Figure 1:
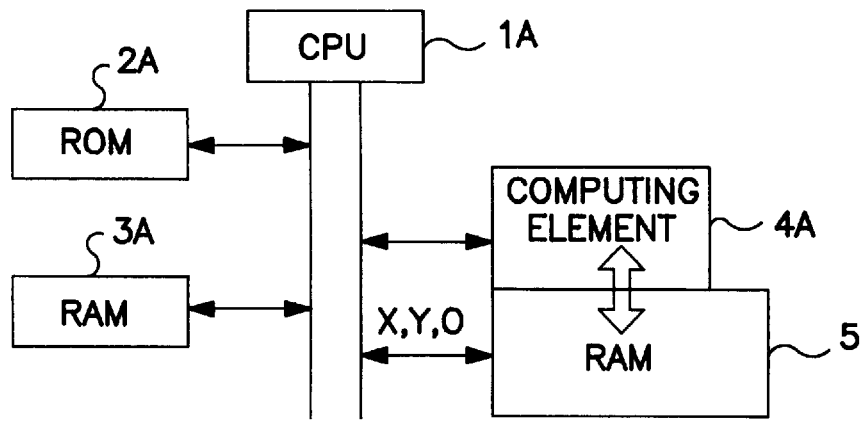
FIG. 1 is a block diagram of a first data processor according to the prior art of the present invention.

Now, in a first data processor according to the prior art, a RAM 5 for operation data is connected to a computing element 4A for supporting the operation of a CPU 1A, and input data X and Y developed in the RAM 5 are read out successively as shown in FIG. 1. With this, the input data X and the input data Y are computed by means of the computing element 4A.

Therefore, the input data X and Y have to be transferred in advance before operation to the RAM 5 for operation data which become an exclusive data region of the computing element 4A. This fact causes such problems in the prior art of the present invention that the total data processing time becomes "the time required for data transfer plus operation," thus requiring a long processing time, and thereby preventing a high speed of data processing.

Besides, a packaging area of a memory is enlarged by the number of circuits of the RAM 5 for operation data. Furthermore, it is difficult to use the device when the number of operation terms at the memory capacity of the RAM 5 or more is produced.

Figure 2:
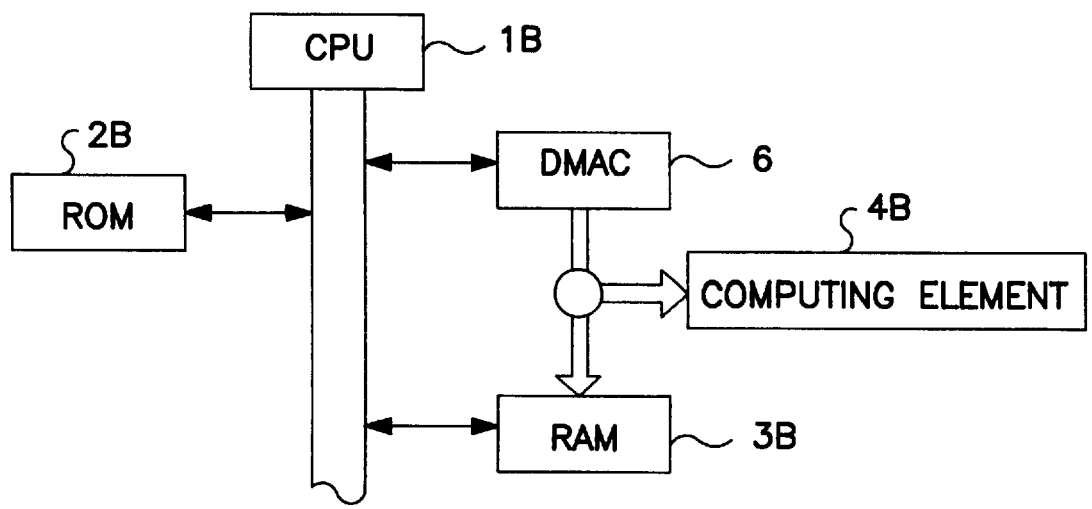
FIG. 2 is a block diagram of a second data processor according to the prior art of the present invention.

Further, in a second data processor according to the prior art of the present invention, a DMAC 6 is connected to a computing element 4B for supporting the operation of the CPU 1B as shown in FIG. 2, and the resulting data are read out directly from a general-use RAM 3B through the DMAC 6. With this, when the input data X and Y are computed by a computing element 4B, the resulting data O are written directly into the general-use RAM 3B through the DMAC 6.

As a result, the total data processing time is improved by a large margin as compared with the first data processor depending on the performance of the DMAC 6. Since the input data X and Y are inputted to the computing element 4B by means of software or hardware, however, it is required to assign addresses of the computing element 4B efficiently so that the action gets faster in speed. Besides, the packaging area is enlarged by the circuit portion of the DMAC 6, and moreover, the input data X and Y have to be kept developed in the general-use RAM 3B until the operation comes to an end.

With this, the operation speed of the computing element 4B depends on the performance of the DMAC 6, and the performance of the DMAC 6 is an obstacle to achieving a higher speed of data processing. Further, there is such a problem that the number of programs on the software is increased when the computation expression of the computing element 4B becomes complicated.

Figure 3:
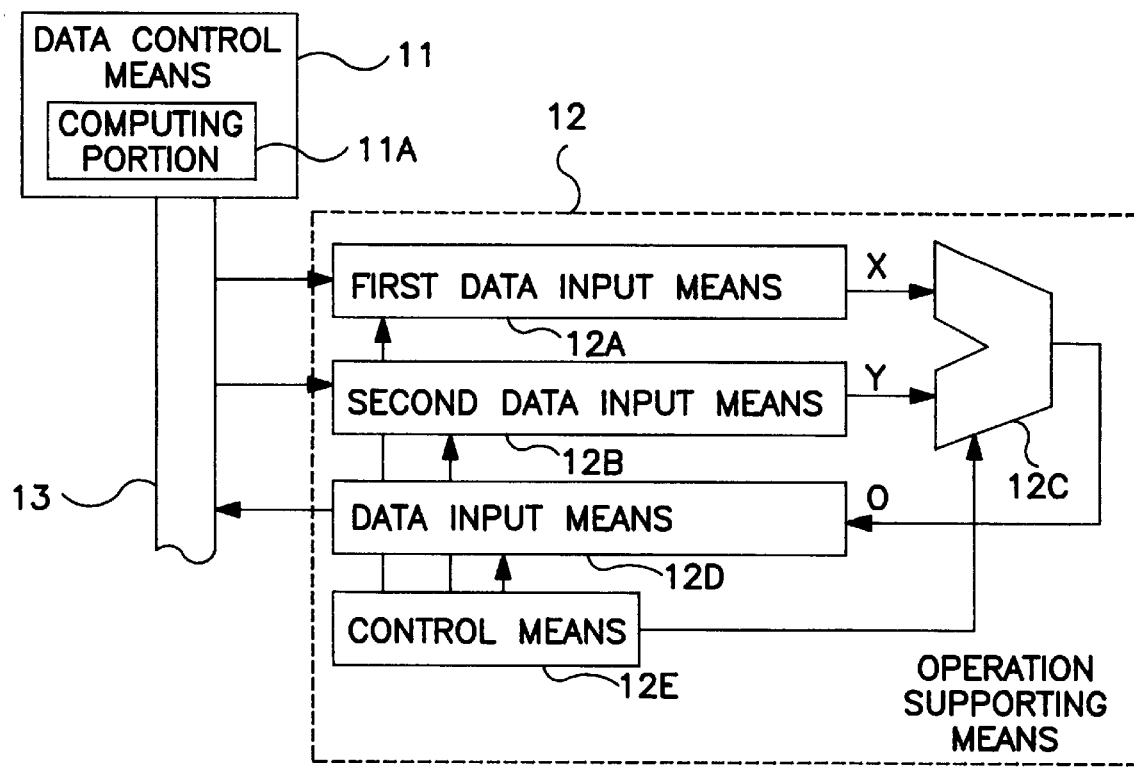
FIG. 3 is a block diagram of a first data processor in principle according to the present invention.

As against the above, a data processor in principle according to the present invention is provided with operation supporting means 12 for supporting the operation of data control means 11 in addition to a computing portion 11A provided in the data control means 11 for executing various instructions as shown in FIG. 3. The operation supporting means 12 includes first and second data input(storage) means 12A and 12B, arithmetic means 12C and data output (storage) means 12D. The data input means 12A inputs the first data X, the second data input means 12D inputs the second data Y, the arithmetic means 12C computes the first data X and the second data Y, and the data output means 12D holds the operation resulting data (hereinafter referred to as the resulting data O).

In detail, the data processor according to the present invention comprises first storing means (hereinafter called the first data input means 12A) for storing a piece of first set data X, second storing means (hereinafter called the second data input means 12B) for storing a piece of second set data Y, arithmetic means 12C for performing an arithmetic operation by using the first set data X stored in the data input means 12A and the second set data Y stored in the second data input means 12B, third storing means (the data output means 12D) for storing a piece of arithmetic resulting data obtained in the arithmetic means 12C, and control means 12E for inputting and storing a lower half portion (lower order data) of the first set data X in the first data input means 12A in synchronization with a first clock of a first writing cycle, inputting and storing an upper half portion (upper order data) of the first set data X in the first data input means 12A in synchronization with a second clock of the first writing cycle, inputting and storing a lower half portion (lower order data) of the second set data Y in the second data input means 12B in synchronization with a first clock of a second writing cycle, inputting and storing an upper half portion (upper order data) of the second set data Y in the second data input means 12B in synchronization with a second clock of the second writing cycle, inputting the lower half portion of the first set data X stored in the first data input means 12A and the lower half portion of the second set data Y stored in the second data input means 12B to the arithmetic means 12C bit by bit in the order from the least significant bits of the set data X and Y to upper bits in synchronization with the second clock of the second writing cycle, performing an arithmetic operation in the arithmetic means 12C by using a bit of the lower half portion of the first set data X and a bit of the lower half portion of the second set data Y each time one bit of the lower half portion of the first set data X and one bit of the lower half portion of the second set data Y are input to the arithmetic means 12C in synchronization with each other, storing each bit of the arithmetic resulting data obtained as a result of the arithmetic operation in the data output means 12D in the order in which bits of the arithmetic resulting data are obtained, outputting the arithmetic resulting data corresponding to the lower half portions of the first and second set data X and Y from the data output means 12D in synchronization with a first clock of a reading cycle, inputting the upper half portion of the first set data X stored in the first data input means 12A and the upper half portion of the second set data Y stored in the second data input means 12B to the arithmetic means 12C bit by bit in the order from the least significant bits of the set data X and Y to upper bits in synchronization with the first clock of the reading cycle, performing an arithmetic operation in the arithmetic means 12C by using a bit of the upper half portion of the first set data X and a bit of the upper half portion of the second set data Y each time one bit of the upper half portion of the first set data X and one bit of the upper half portion of the second set data Y are input to the arithmetic means 12C in synchronization with each other, storing each bit of the arithmetic resulting data obtained as a result of the arithmetic operation in the data output means 12D in the order in which bits of the arithmetic resulting data are obtained, and outputting the arithmetic resulting data corresponding to the upper half portions of the first and second set data X and Y from the data output means 12D in synchronization with a second clock of the reading cycle.

Figure 4:
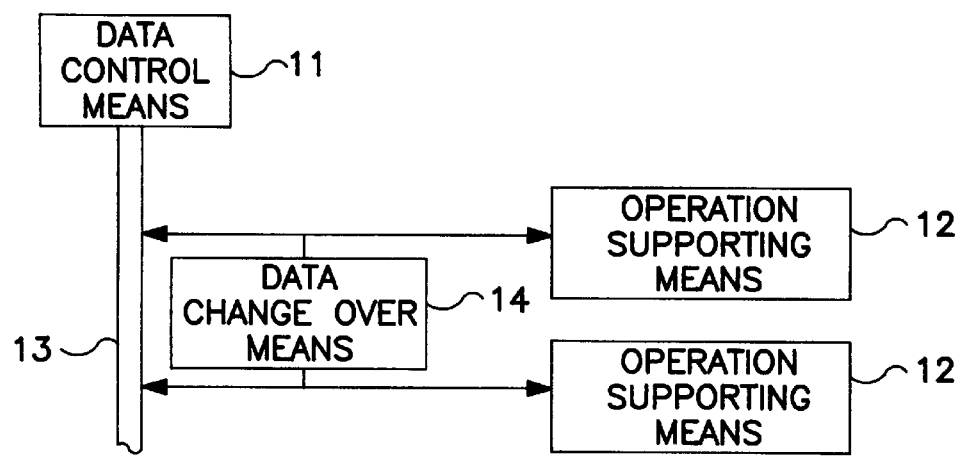
FIG. 4 is a block diagram of a second data processor in principle according to the present invention.

Further, in the data processor of the present invention, two or more operation supporting means 12 are connected to a signal line 13 and the signal line 13 is connected to the data control means 11 as shown in FIG. 4. Respective operation supporting means 12 support the operation of the data control means 11.

Besides, in the data processor of the present invention, data change-over means 14 is connected between the data output means 12D of one operation supporting means 12 and the data input means 12A or the data input means 12B of the other operation supporting means 12 as shown in FIG. 4. The data change-over means 14 selects a transfer destination of the resulting data O.

Furthermore, a first method of computing data of the present invention is a method of supporting operation when various instructions are executed, in which the transfer of the data X is received in a first write cycle for writing numeric values on the operating side into a memory. Thereafter, the transfer of the data Y is received in a second write cycle for writing numeric values on the operated side into a memory. Next, the data X and the data Y are computed. Then, the resulting data O are transferred in a read cycle for outputting the operation result values.

Further, in the first method of computing data of the present invention, the operation is started after transfer of a lower order byte of the data Y is received in the second write cycle.

Furthermore, the method of computing data of the present invention is a method of supporting the operation when various instructions are executed, in which the resulting data O obtained by the support of the operation on one side are used as the data X or the data Y when the operation on the other side is supported, thereby to perform pipeline operation processing.

Next, the operation of a first data processor in principle of the present invention will be described. For example, as shown in FIG. 3, when the data X are inputted to the data input means 12A and the data Y are inputted to the data input means 12B, the operation is performed with the data X and the data Y by the arithmetic means 12C, and the resulting data O are inputted to the data output means 12D. With this, it becomes possible to support the operation of the data control means 11 by the operation supporting means 12 provided separately from the computing portion 11A of the data control means 11.

The action of this data processor is described in detail. The lower half portion of the first set data X is initially input to the first data input means 12A under the control of the control means 12E in synchronization with the first clock of the first writing cycle. As a result, the lower half portion of the first set data X is stored in the first data input means 12A.

Thereafter, the upper half portion of the first set data X is input to the first data input means 12A under the control of the control means 12E in synchronization with the second clock of the first writing cycle. As a result, the upper half portion of the first set data X is stored in the first data input means 12A.

Also, the lower half portion of the second set data Y is input to the second data input means 12B under the control of the control means 12E in synchronization with the first clock of the second writing cycle. As a result, the lower half portion of the second set data Y is stored in the second data input means 12B.

Thereafter, the upper half portion of the second set data Y is input to the second data input means 12B under the control of the control means 12E in synchronization with the second clock of the second writing cycle, and the lower half portion of the first set data X stored in the first data input means 12A and the lower half portion of the second set data Y stored in the second data input means 12B are input to the arithmetic means 12C bit by bit in the order from the least significant bits of the set data X and Y to upper bits under the control of the control means 12E in synchronization with the second clock of the second writing cycle. As a result, the upper half portion of the second set data Y is stored in the second data input means 12B, and an arithmetic operation is performed in the arithmetic means 12C by using a bit of the lower half portion of the first set data X and a bit of the lower half portion of the second set data Y each time one bit of the lower half portion of the first set data X and one bit of the lower half portion of the second set data Y are input to the arithmetic means 12C in synchronization with each other.

Thereafter, bits of the resulting data O corresponding to the lower half portions of the first and second set data X and Y are output from the arithmetic means 12C to the data output means 12D bit by bit in the order in which the bits of the resulting data O are obtained in the arithmetic processing.

In addition, the resulting data O corresponding to the lower half portions of the first and second set data X and Y are output from the data output means 12D in synchronization with the first clock of the reading cycle under the control of the control means 12E, and the upper half portion of the first set data X stored in the first data input means 12A and the upper half portion of the second set data Y stored in the second data input means 12B are input to the arithmetic means 12C bit by bit in the order from the least significant bits of the set data X and Y to upper bits in synchronization with the first clock of the reading cycle under the control of the control means 12E. As a result, the resulting data O corresponding to the lower half portions of the first and second set data X and Y are read out from the data output means 12D, and an arithmetic operation is performed in the arithmetic means 12C by using a bit of the upper half portion of the first set data X and a bit of the upper half portion of the second set data Y each time one bit of the upper half portion of the first set data X and one bit of the upper half portion of the second set data Y are input to the arithmetic means 12C in synchronization with each other.

Thereafter, bits of the resulting data O corresponding to the upper half portions of the first and second set data X and Y are output from the arithmetic means 12C to the data output means 12D bit by bit in the order in which the bits of the resulting data O are obtained in the arithmetic processing.

In addition, the resulting data O corresponding to the upper half portions of the first and second set data X and Y are output from the data output means 12D in synchronization with the second clock of the reading cycle under the control of the control means 12E.

As is described above, in the data processor according to the present invention, the lower half portion of the second set data Y is input to the second data input means 12B in the second writing cycle, and the arithmetic processing is started after the input of the lower half portion of the second set data Y is finished. Therefore, the arithmetic processing can be performed while the first set data X is input to the first data input means 12A, the second set data Y is input to the second data input means 12B and the arithmetic resulting data O is read out from the data output means 12D.

Accordingly, because it is not required to additionally arrange an arithmetic stage in a pipeline processing, any calculating time is not required in any arithmetic stage, and the data processing can be performed at a higher speed.

As a result, the RAM for operation data which become the exclusive data region of the arithmetic means 12C and a DMAC for writing/reading the operation data and the resulting data as existing in the prior art of the present invention are no longer required. Further, it is possible to omit the RAM for operation data and the DMAC as used in the prior art of the present invention, and it becomes possible to allow for a margin in the packaging area by the circuit scale. Furthermore, it becomes possible to perform the operation at a high speed with a limited circuit structure even when the computation expression of the computing portion is complicated.

Next, the operation of a second data processor in principle of the present invention will be described. For example, as shown in FIG. 4, the resulting data O held by the data output means 12D of one operation supporting means 12 are transferred to the data input means 12A or the data input means 12B of the other operation supporting means 12, or the resulting data O are controlled so as to be changed over to be transferred to the other general-use RAM or the like.

As a result, it becomes possible to select either normal parallel data processing or pipeline operation processing. This fact makes it possible to perform a parallel supporting operation with respect to the computing portion 11A of the data control means 11.

This fact goes far toward contribution to improvement of the operational function of the data processor and improvement of the high speed action thereof.

Furthermore, in the method of computing data of the present invention, the data X are transferred to the data input means 12A by the first write cycle and the data Y are transferred to the data input means 12B by the second write cycle thereafter, thus the data X and the data Y are computed.

For example, the addresses of the arithmetic means 12C are assigned efficiently so that the data X and the data Y are transferred to the arithmetic means 12C at a high speed by means of software or hardware. Further, when control is made so that the operation is started upon receipt of the transfer of the data Y by the second write cycle, the resulting data O are transferred from the data output means 12D to the other storage means or the like in the read cycle.

Thus, it becomes no longer required to transfer the data X and the data Y in advance to an exclusive data region of the arithmetic means 12C and keep them developed there as in the prior art of the present invention before the operation. Further, since the arithmetic processing is started by receiving transfer of the data Y, it is possible to make the total data processing time equal to the data transfer time, and an additional time for the arithmetic processing performed within a time required for the data transfer processing is not required. Further, even when the computation expression of the arithmetic means 12C becomes complicated, it is possible to make the number of programs of the software equal to the number of control programs. Here, the number of control programs means the number of controls of transferring data. For example, these include transfer of the data X in the first write cycle, transfer of the data Y in the second write cycle, transfer of the resulting data O in the read cycle and so on.

With this, dependency on the performance of a DMAC or the like as in the prior art of the present invention no longer occurs and it is possible to have the total data processing time depend on the first and the second write cycles and the read cycle, thus making it possible to aim at substantial improvement of the data processing speed as compared with the prior art of the present invention. Further, since an aim is to achieve a sharp reduction of the data processing time, it becomes possible to aim at achieving a high speed of data processing.

Furthermore, according to the method of computing data of the present invention, the resulting data O obtained by supporting the operation on one side are used as the data X or the data Y in supporting the operation on the other side, and pipeline operation processing is performed.

As a result, a parallel supporting operation can be performed at a high speed for the computing portion 11A of the data control means 11, thereby to enable to correspond to diversified operation uses only by alteration of the arithmetic means 12C.

With this, it becomes possible to aim at improvement of the operational function and high speed action of the data processor concerned.

Next, preferred embodiments of the present invention will be described with reference to the drawings.

(1) Description of a first preferred embodiment

Figure 5:
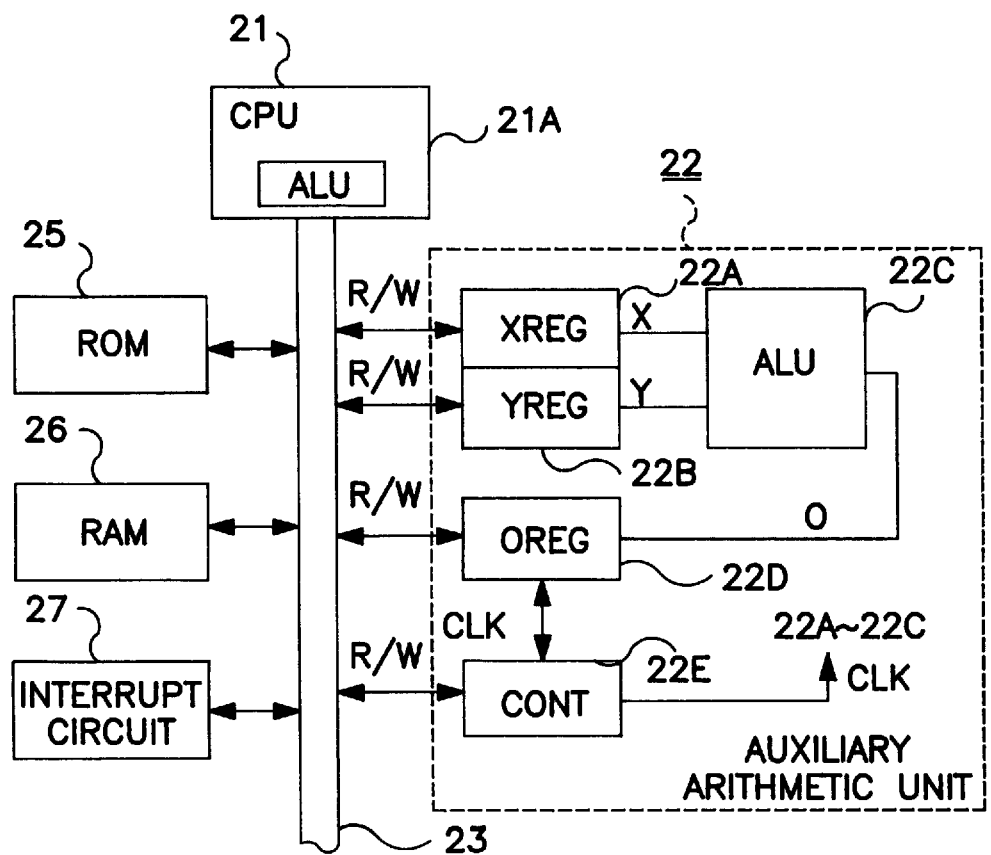
FIG. 5 is a general block diagram of a data processor according to a first preferred embodiment of the present invention.

For example, a first data processor provided with a computing element 22C in addition to a computing element (hereinafter referred to as an ALU) 21A of a CPU 21 includes a CPU 21, an auxiliary arithmetic unit 22, a ROM 25, a general-use RAM 26 and an interrupt circuit 27 which are connected to a bus 23 as shown in FIG. 5.

Namely, the CPU 21 is an embodiment of the data control means 11, and controls inputs-outputs of the auxiliary arithmetic unit 22, the ROM 25, the general-use RAM 26 and the interrupt circuit 27. Besides, the ALU 21A is provided in the CPU 21, but the operational function of the ALU 21A may be inferior to the operational function of a computing element 22C of the auxiliary arithmetic unit 22 in the embodiment of the present invention.

The auxiliary arithmetic unit 22 is an embodiment of the operation supporting means 12, and includes a first arithmetic register (hereinafter referred to simply as an XREG) 22A, a second arithmetic register (hereinafter referred to simply as a YREG) 22B, a computing element 22C, a result register (hereinafter referred to simply as an OREG) 22D and a control portion 22E. Besides, the auxiliary arithmetic unit 22 will be described in detail with reference to FIG. 6. The address mapping of respective registers will be described in detail with reference to FIGS. 7A and 7B and FIGS. 8A and 8B.

Further, the ROM 25 stores micro control programs of the data processor and includes an electrically erasable programmable read-only memory (EEPROM) and an erasable programmable read-only memory (EPROM). The general-use RAM 26 stores data obtained by the operation of the CPU 21 and the resulting data O outputted from the OREG 22D. A non-periodical write/writable-readable memory is used in the general-use RAM 26. The interrupt circuit 27 controls interrupt request generated in the CPU 21 and the auxiliary arithmetic unit 22.

With this, the auxiliary arithmetic unit 22 supports the operation of the ALU 21A provided in the CPU 21.

Figure 6:
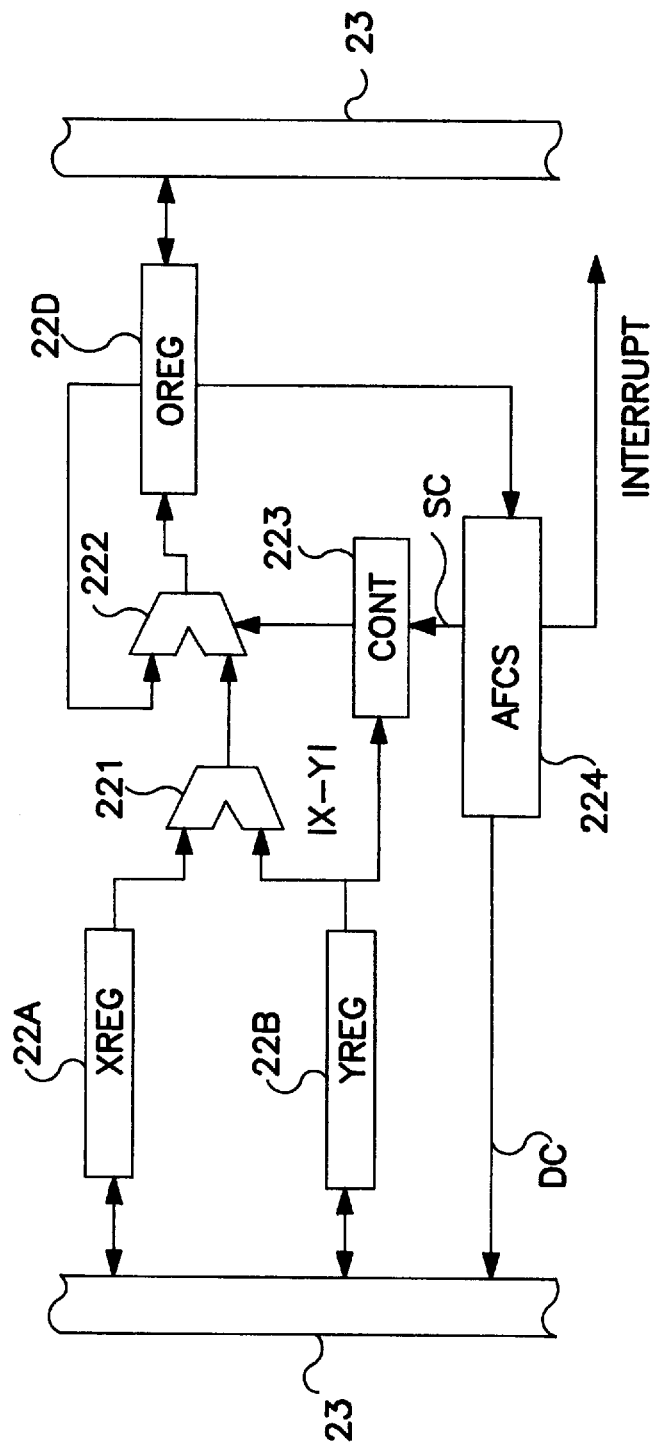
FIG. 6 is an internal block diagram of a supporting arithmetic unit according to respective embodiments of the present invention.

Next, an internal block diagram of the auxiliary arithmetic unit according to respective embodiments of the present invention will be described with reference to FIG. 6. For example, the auxiliary arithmetic unit 22 for computing such a computation expression (1) as shown hereunder $$\Sigma |X-Y| \tag{1}$$

includes an XREG 22A, a YREG 22B and an OREG 22D forming respective registers, |X-Y| computing element 221 and a Σ computing element 222 forming the computing element 22C, a control circuit 223 forming a control portion 22E and a control status register (hereinafter referred to simply as an AFCS) 224.

The auxiliary arithmetic unit 22 subtracts the register value of the YREG 22B from the register value of the XREG 22A, and adds absolute values resulting therefrom successively.

Namely, the XREG 22A is an embodiment of the first data input means 12A, and is a writable/readable register R/W for storing the input data which is an example of the first data X by means of a clock signal CLK which becomes the action reference of the data processor for instance.

Here, the XREG 22A completes the write of the input data X during the first write cycle. The write cycle is a period of time in which the clock signal CLK requires two cycles. The clock signal CLK is a signal which becomes the reference of arithmetic action, and is supplied from a control circuit 223 for instance. The XREG 22A has a pair of 16-bit registers. The input data X stored here include unsigned 16 bits.

Figure 7A:
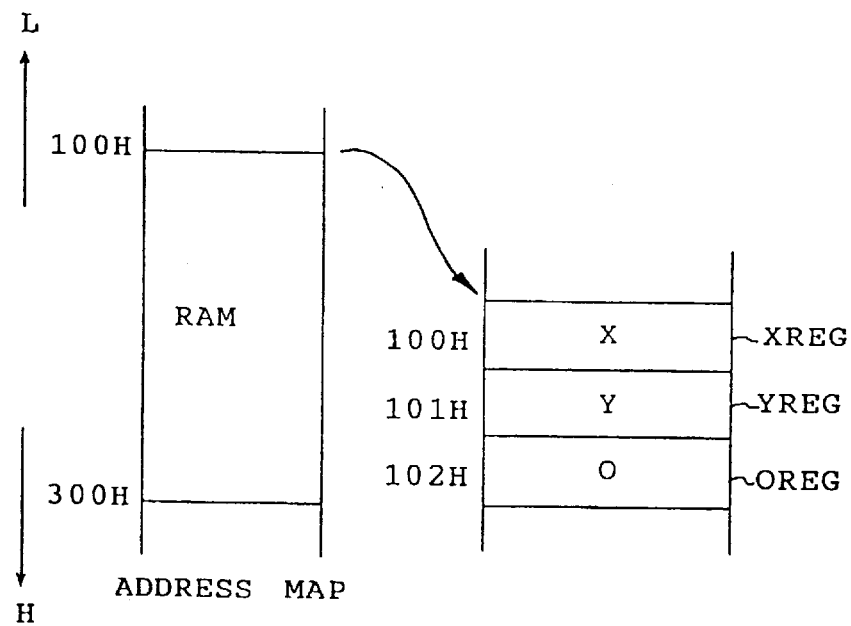
FIG. 7A is an explanatory diagram of address mapping of respective registers according to respective embodiments of the present invention.

Further, the address mapping of respective registers according to respective embodiments of the present invention is such that the input data (operation data) X are assigned to a lower order address 100H which designates the XREG 22A, and then, the input data (operation data) Y are assigned to an address 101H which designates the YREG 22B as shown in FIG. 7A for instance. That is, it is preferred that an address to which the data X input to the XREG 22A is assigned, an address to which the data Y input to the YREG 22B is assigned and an address to which the resulting data O output from the OREG 22D is assigned be arranged in succession in a memory of the general-use RAM 26 to operate the computing element 22C at a high speed. This mapping shows a case that the same addresses as the general-use RAM 26 are adopted, and the general-use RAM 26 includes a memory region in an address map range from the lower order address 100H (hexadecimal) to an upper order address 300H. An address 102H for designating the OREG 22D is assigned to the resulting data O.

Figure 7B:
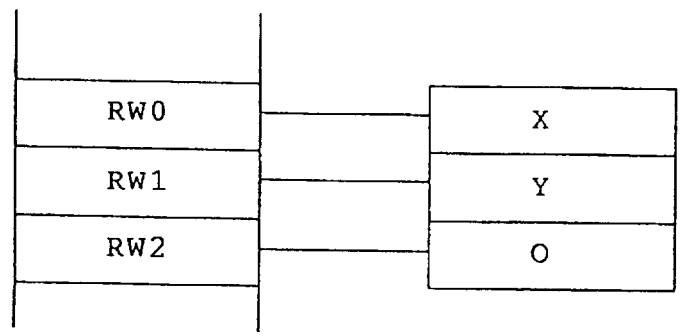
FIG. 7B is a diagram for explaining address mapping on the software according to respective embodiments of the present invention.

Besides, when the addresses are assigned most efficiently onto the software, they are assigned to addresses of short execution time as shown in FIG. 7B. That is, it is also preferred that a plurality of addresses to which a plurality of pieces of data X input to the XREG 22A one after another are assigned be arranged in a group in a memory of the general-use RAM 26, a plurality of addresses to which a plurality of pieces of data Y input to the YREG 22B one after another are assigned be arranged in a group in the memory of the general-use RAM 26, a plurality of addresses to which a plurality of pieces of resulting data O output from the OREG 22D one after another are assigned be arranged in a group in the memory of the general-use RAM 26, and the three groups of addresses be arranged in succession. In this case, the computing element 22C can be operated at a high speed. The assignment of addresses depends on the architecture of the CPU 21. For example, according to the assigning method, when the execution time of MOV (transfer instruction), a general-use register RW, an accumulate A or the like is short with respect to the data processing action, the input data X are assigned to a general-use register RWO on the address map. Next, the input data Y are assigned to a general-use register RW1. The resulting data O are assigned to a general-use register RW2 on the address map.

Figure 8A:
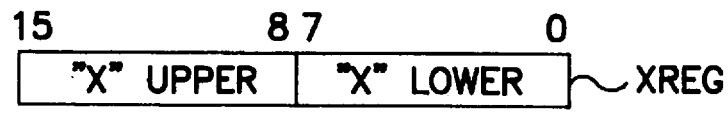
FIG. 8A is an explanatory diagram of a first arithmetic register (XREG) according to respective embodiments of the present invention.
Figure 8B:
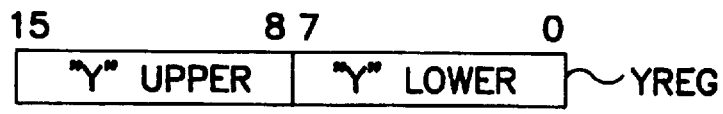
FIG. 8B is an explanatory diagram of a second arithmetic register (YREG) according to respective embodiments of the present invention.

As a concrete example in which the same address mapping as the address mapping of the general-use RAM 26 is adopted, when lower half bits of the first data X, XD00 to XD07, are assigned to a lower order address "000080H" as a number X to be computed, they are stored in bits 0 to 7 of the XREG 22A as shown in FIG. 8A. Here, the initial value of the bits 0 to 7 of the XREG 22A is "00000000".

Furthermore, when upper half bits of the first data X, XD08 to XD15, are assigned to an upper order address "000081H" as a number X to be computed, they are stored in bits 8 to 15. The initial value of these bits 8 to 15 is "00000000". The YREG 22B is an embodiment of the second data input means 12B, and is a writable/readable register R/W for inputting operation data which is an example of the second data Y. The write/read of the operation data is made by the clock signal CLK which is an action reference. Here, the YREG 22B completes the write of the input data Y during a second write cycle. The second write cycle is generated in the wake of the first write cycle, and is a period of time in which the clock signal CLK requires two cycles.

To be concrete, when lower half bits YD00 to YD07 are assigned to a lower order address "000082H" as a subtrahend Y to be computed, they are stored in the bits 0 to 7 of the YREG 22B. The initial value of these bits 0 to 7 is "00000000". Furthermore, when upper half bits YD08 to YD15 are assigned to an upper order address "000083H" as a subtrahend Y to be computed, they are stored in the bits 8 to 15 of the YREG 22B. The initial value of these bits 8 to 15 is "00000000". Besides, the computing element 22C is started to operate by applying write action (W) to the lower order byte of the YREG 22B, and does not operate in the read cycle does operate in the second write cycle and the read cycle. The read cycle is generated continuously to the second write cycle, and is a period of time in which the clock signal CLK requires two cycles.

Thus, it is assumed in the embodiment of the present invention to set the YREG 22B after the XREG 22A is set. The computing element 22C is an embodiment of the arithmetic means 12C, and performs the operation with input data X and Y. For example, the computing element 22C has the |X-Y| computing element 221 and a Σ computing element 222. The |X-Y| computing element 221 starts a subtracting action of the absolute values of the input data X and Y upon completion of the write by the second write cycle of the YREG 22B.

Further, the Σ computing element 222 applies sequential addition processing (accumulates) the data resulting from subtraction based on the input data X and Y. Besides, the arithmetic action is started by write operation into the lower order byte of the YREG 22B, and terminates the arithmetic action after requiring the operation period of time=two cycles.

The OREG 22D is an embodiment of the data output means 12D, and is a read-only register for holding the resulting data O outputted from the computing element 22C.

To be concrete, lower half bits OD00 to OD07 are assigned to a lower order address "000084H" as resulting data, and they are stored in the bits 0 to 7 of the OREG 22D as shown in FIG. 9A. The initial value of these bits 0 to 7 is "00000000". Further, upper half bits OD08 to OD15 are assigned to an upper order address "000085H" as resulting data, and they are stored in the bits 8 to 15 of the OREG 22D. The initial value of these bits 8 to 15 is "00000000".

The OREG 22D writes the resulting data O computed by the computing element 22C, and when the data overflow, an overflow flag (COVF) is set. Further, the OREG 22D is cleared by an RCLR bit of an AFCS 224. The OREG 22D is also cleared by resetting. The resulting data O is structured with unsigned 16 bits plus an overflow flag. The overflow flag set is inserted in a third cycle.

Further, the controller 22E controls the input-output of the XREG 22A, the YREG 22B, the computing element 22C and the OREG 22D. For example, the controller 22E has the control circuit 223 and the AFCS 224. The control circuit 223 supplies a clock signal CLK which becomes an action reference to the XREG 22A, the YREG 22B, the computing element 22C and the OREG 22D.

Also, as shown in FIG. 5, the input and output in the XREG 22A, the YREG 22B, the computing element 22C and the OREG 22D are controlled by a control unit 22E. The control unit 22E is one example of the control means 12E. As shown in FIG. 6, for example, the control unit 22E comprises a control circuit 223 and an AFSC 224. The control circuit 223 is made of a counter circuit, and a plurality of timing control signals are output from the control circuit 223 to the XREG 22A, the YREG 22B, the computing element 22C and the OREG 22D when a clock signal Clk functioning as an action standard is received in the control circuit 223. The timing control signals are classified into a first lower half data writing signal (hereinafter called an SXL signal), a first upper half data writing signal (hereinafter called an SXU signal), a second lower half data writing signal (hereinafter called an SYL signal), a second upper half data writing signal (hereinafter called an SYU signal), a pair of arithmetic operation start permitting signals S1 and S2, a lower half data reading signal (hereinafter called an SOL signal), an upper half data reading signal (hereinafter called an SOU signal) and the like.

In this embodiment, the first writing cycle for the data X is prescribed by two clock signals Clk, the second writing cycle for the data Y is prescribed by the two following clock signals Clk, and the reading cycle for the arithmetic result data O is prescribed by the two still following clock signals Clk.

The SXL signal is output from the control circuit 223 to the XREG 22A in synchronization with a leading edge of the first clock of the first writing cycle. The SXL signal denotes a signal for permitting a writing operation for the lower half portion of the data X. Also, the SXU signal is output from the control circuit 223 to the XREG 22A in synchronization with a leading edge of the second clock of the first writing cycle. The SXU signal denotes a signal for permitting a writing operation for the upper half portion of the data X.

Also, the SYL signal is output from the control circuit 223 to the YREG 22B in synchronization with a leading edge of the first clock of the second writing cycle. The SYL signal denotes a signal for permitting a writing operation for the lower half portion of the data Y. Also, the SYU signal is output from the control circuit 223 to the YREG 22B in synchronization with a leading edge of the second clock of the second writing cycle. The SYU signal denotes a signal for permitting a writing operation for the upper half portion of the data Y.

Also, the start of an input operation of the lower half portion of the data Y to the YREG 22B is recognized by the control circuit 223 when the leading edge of the first clock of the second writing cycle is detected by the control circuit 223. Thereafter, when the lower half portion of the data Y is input to the YREG 22B, the signal S1 for permitting an arithmetic operation to be performed in the |X-Y| computing element 221 is output from the control circuit 223 to the |X-Y| computing element 221 in synchronization with the leading edge of the second clock of the second writing cycle. When the arithmetic processing performed in the |X-Y| computing element 221 is finished, the arithmetic operation start permitting signal S2 is output from the control circuit 223 to the Σ computing element 222.

Furthermore, the control status register (AFCS) 224 constitutes a part of the controller 22E, and now generates interruption and now outputs a control signal SC to the control circuit 223 depending on control data DC.

To be concrete, the control data DC are assigned to a lower order address "000086H" and are stored in the bits 0 to 7 of the AFCS 224 as shown in FIG. 9B. In the AFCS 224, a calculated interrupt enable (CIE) bit, a calculated overflow flag (COVF) bit and a register clear (RCLR) bit are written, respectively. The CIE bit is written at the bit 7, the COVF bit is written at the bit 6, and the RCLR bit is written at the bit 0, respectively. Besides, the initial values of respective bits are 00–0, and the contents of respective bits of the AFCS 224 are shown in TABLE 1.

TABLE 1

| BIT | | CONTENT ITEMS | |
| --- | --- | --- | --- |
| 7 | CIE | 0 | OVEREFLOW DISABLE |
| | | 1 | OVERFLOW ENABLE |
| 6 | COVF | SET | GENERATION OF OVERFLOW |
| | | CLEAR | WRITE OF [0] AND RESET |
| 0 | RCLR | 0 | ON ACTION |
| | | 1 | OREG - CLEAR 000H |

For example, the CIE bit shows data for permitting interrupt when the resulting data O overflows as shown in FIG. 10B, and is cleared by resetting. This presents the contents showing overflow disable by the write of "0" and showing overflow enable by the write of "1". Besides, when the operation is terminated, it is impossible to shift to interrupt processing.

The COVF bit shows a flag which is raised when the resulting data O overflows. For example, it is when the resulting data O reach "FFFF$_H$" or more that the flag is set, and the flag is cleared by the write of "0" or resetting. The main cause of setting is by generation of overflow, and the main cause of clearing is by the write of "0" and resetting. The RCLR bit is one for clearing the OREG 22D, and it is possible to read the resulting data O by the write of "0". Further, "no function and no influence on the action" is shown by writing "0", and the OREG 22D is cleared "0009$_H$" by writing "1".

Next, an action of the supporting arithmetic unit 12 is described with reference to FIG. 10A. As shown in FIG.

10A, the SXL signal is output from the control circuit 223 to the XREG 22A in synchronization with the first clock of the first writing cycle, and a lower half portion (or pieces of lower order data) XD00 to XD07 of the input data X is input to the XREG 22A under the control of the control circuit 223. As a result, the lower half portion XD00 to XD07 of the input data X is stored in the XREG 22A.

Thereafter, the SXU signal is output from the control circuit 223 to the XREG 22A, and the upper half portion (or pieces of upper half bits) XD08 to XD15 of the input data X is input to the XREG 22A in synchronization with the second clock of the first writing cycle under the control of the control circuit 223. As a result, the lower half portion XD08 to XD15 of the input data X is stored in the XREG 22A.

Also, the SYL signal is output from the control circuit 223 to the YREG 22B, and a lower half portion (or pieces of lower half bits) YD00 to YD07 of the input data Y is input to the YREG 22B in synchronization with the first clock of the second writing cycle under the control of the control circuit 223. As a result, the lower half portion YD00 to YD07 of the input data Y is stored in the YREG 22B.

In addition, the SYU signal is output from the control circuit 223 to the YREG 22B, the signal S1 is output from the control circuit 223 to the |X−Y| computing element 221, an upper half portion (or pieces of upper half bits) YD08 to YD15 of the input data Y are input to the YREG 22B in synchronization with the second clock of the second writing cycle under the control of the control circuit 223, and the lower half portion XD00 to XD07 of the input data X stored in the Xreg 22A and the lower half portion YD00 to YD07 of the input data Y stored in the YREG 22B are input to the |X−Y| computing element 221 bit by bit in the order from the least significant bits XD00 and YD00 of the data X and Y to upper bits under the control of the control circuit 223.

As a result, the upper half portion YD08 to YD15 of the input data Y is stored in the YREG 22B, and the arithmetic processing for the lower half portion XD00 to XD07 of the input data X and the lower half portion YD00 to YD07 of the input data Y is started in the |X−Y| computing element 221 bit by bit in the order from the least significant bits XD00 and YD00 of the data X and Y to upper bits. Thereafter, the arithmetic resulting data obtained in the |X−Y| computing element 221 is input to the Σ computing element 222 bit by bit in the order of finishing the arithmetic operation. In the Σ computing element 222, when the signal S2 is received, the arithmetic resulting data which are obtained in the previous cycle and are stored in the OREG 22D and the arithmetic resulting data currently obtained in the |X−Y| computing element 221 are added to each other. Because the arithmetic resulting data obtained in the Σ computing element 222 are output to the OREG 22D, a lower half portion OD00 to OD07 of the arithmetic resulting data is stored in the OREG 22D.

Thereafter, the SOL signal is output from the control circuit 223 to the OREG 22D, the signal S1 is output from the control circuit 223 to the |X−Y| computing element 221, the lower half portion OD00 to OD07 of the arithmetic resulting data is output from the OREG 22D in synchronization with the first clock of the reading cycle under the control of the control circuit 223, and the upper half portion XD08 to XD15 of the input data X stored in the XREG 22A and the upper half portion YD08 to YD15 of the input data Y stored in the YREG 22B are input to the |X−Y| computing element 221 bit by bit in the order from the least significant bits XD08 and YD08 of the data X and Y to upper bits under the control of the control circuit 223.

As a result, the lower half portion OD00 to OD07 of the arithmetic resulting data is read out from the OREG 22D, and the arithmetic processing for the upper half portion XD08 to XD15 of the input data X and the upper half portion YD08 to YD15 of the input data Y is started in the |X−Y| computing element 221 bit by bit in the order from the least significant bits XD08 and YD08 of the data X and Y to upper bits. Thereafter, the arithmetic resulting data obtained in the |X−Y| computing element 221 is input to the Σ computing element 222 bit by bit in the order of finishing the arithmetic operation. In the Σ computing element 222, when the signal S2 is received, the arithmetic resulting data which is obtained in the previous cycle and is stored in the OREG 22D and the arithmetic resulting data currently obtained in the |X−Y| computing element 221 are added to each other. Because the arithmetic resulting data obtained in the Σ computing element 222 is output to the OREG 22D, an upper half portion OD08 to OD15 of the arithmetic resulting data is stored in the OREG 22D.

Thereafter, the SOU signal is output from the control circuit 223 to the OREG 22D, and the upper half portion OD08 to OD15 of the arithmetic resulting data is output from the OREG 22D in synchronization with the second clock of the reading cycle under the control of the control circuit 223. As a result, the upper half portion OD08 to OD15 of the arithmetic resulting data is read out from the OREG 22D.

As is described above, in the data processor according to the present invention, the lower half portion YD00 to YD07 of the input data Y is input to the YREG 22B in synchronization with the second clock of the second writing cycle, and the arithmetic processing is started after the input of the lower half portion of the input data Y is finished. Therefore, the arithmetic processing can be performed during six clocks of the first and second writing cycles and the reading cycle in which the input data X is input to the XREG 22A, the input data Y is input to the YREG 22B and the arithmetic resulting data is read out from the OREG 22D.

Accordingly, because it is not required to additionally arrange an arithmetic stage in a pipeline processing, any calculating time is not required in any arithmetic stage, and the data processing can be performed at a higher speed.

In such a manner, a data processor according to the first embodiment of the present invention is provided with the auxiliary arithmetic unit 22 separately from the ALU 21A provided in the CPU 21. The auxiliary arithmetic unit 22 includes the XREG 22A, the YREG 22B, the |X−Y| computing element 221, the Σ computing element 222, the OREG 22D, the control circuit 223 and the AFCS 224.

As a result, when the input data X are inputted to the XREG 22A and the input data Y are inputted to the YREG 22B, the absolute value X−Y is computed with the input data X and the input data Y by means of the |X−Y| computing element 221, and the resulting value thereof is processed with addition by means of the Σ computing element 222, and the resulting data O are held by the OREG 22D. Thus, it becomes possible to support the operation of the CPU 21 by means of the auxiliary arithmetic unit 22 provided separately from the ALU 21A of the CPU 21.

With this, the RAM for operation data which becomes an exclusive data region of the computing element 22C and the DMAC for controlling direct write/read of the input data X and Y and the resulting data O such as those provided in the prior art of the present invention become unnecessary. Further, the RAM for operation data and the DMAC such as those in the prior art of the present invention can be omitted, and thus it becomes possible to allow for a margin in the packaging area by the circuit scale. Furthermore, even when the computation expression of the ALU is complicated, it becomes possible to perform high speed operation with a limited circuit structure.

Next, the method of computing data according to an embodiment of the present invention will be described while supplementing the action of the data processor of the present invention. Here, the action time chart shown in FIG. 10A and the action flow chart shown in FIG. 10B are referred to. For example, when an arithmetic expression such as the computation expression (1) is computed at a high speed separately from the operation of the CPU 21, the control status register (AFCS) 224 is initialized first in a step P1 in FIG. 10. At this time, a lower order address #81H value, for instance related to the transfer instruction MOV, is written in the AFCS 224 by executing a micro control program.

Here, the micro control program is read out from the ROM 25, and the control data DC is set in the AFSC 224.

Next, the input data X are set in the XREG 22A in a step P2.

At this time, the input data X are transferred to the XREG 22A in the first write cycle. To be concrete, the lower half bits XD00 to XX07 are transferred to the bits 0 to 7 of the XREG 22A as the subtrahend X of an address value #5555H, and the upper half bits XD08 to XD15 of the subtrahend X are transferred to the bits 8 to 15 by executing the micro control program.

Figure 10A:
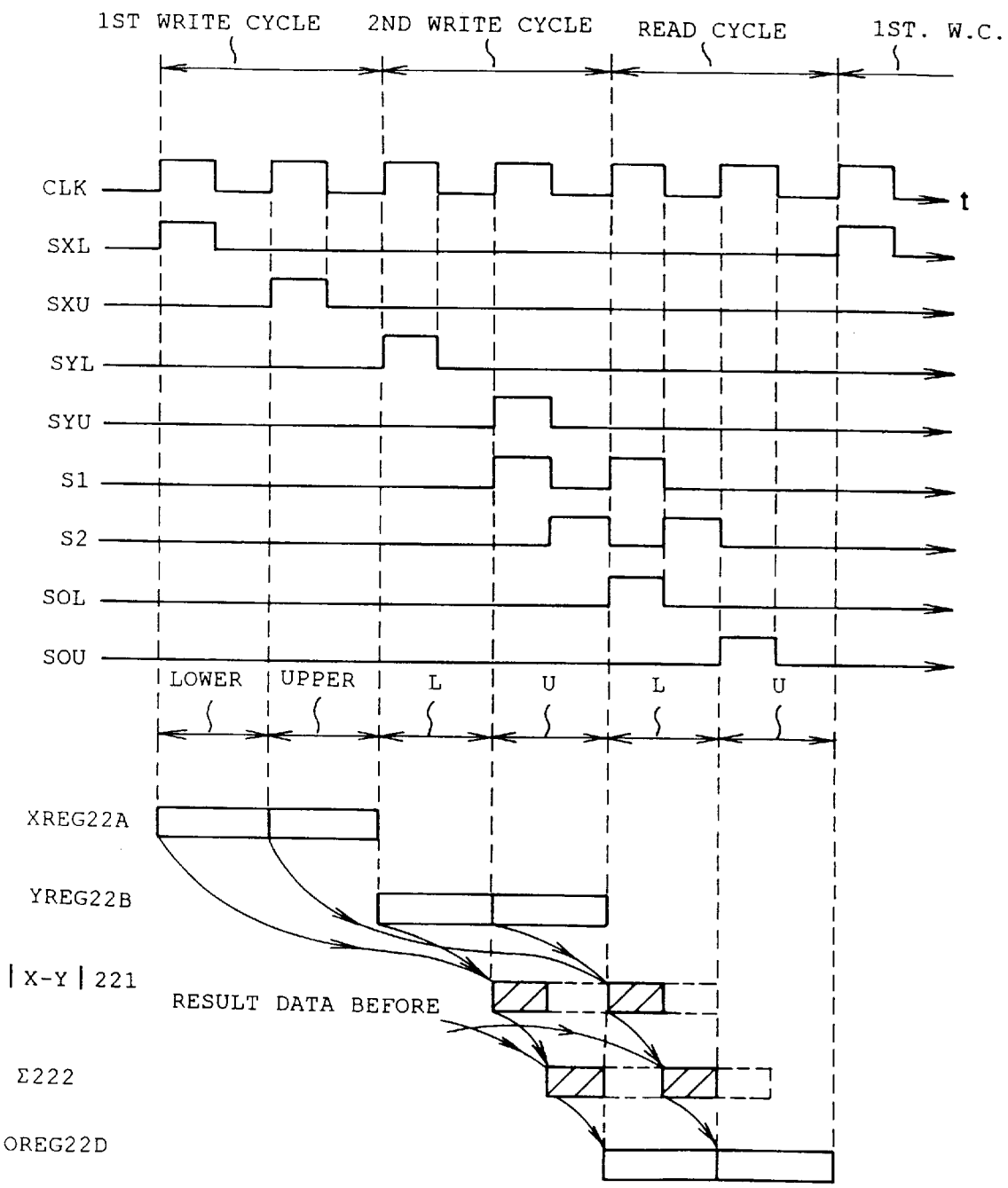
FIG. 10A is an action time chart for the supporting arithmetic unit shown in FIG. 6.

In this case, as shown in FIG. 10A, the lower half bits XD00 to XD07 are input to the lower bits 0 to 7 of the XREG 22A in synchronization with the first clock signal of the first writing cycle under the control of the control circuit 223, and the upper half bits XD08 to XD15 are input to the upper bits 8 to 15 of the XREG 22A in synchronization with the second clock signal of the first writing cycle under the control of the control circuit 223.

Then, the input data Y are set in the YREG 22B in a step P3.

At this time, the input data Y are transferred to the YREG 22B in the second write cycle. To be concrete, the lower half bits YD00 to YD07 are transferred to the bits 0 to 7 of the YREG 22B as a subtrahend Y of an address value #AAAAH and the upper half bits YD08 to YD15 are transferred to the bits 8 to 15 as a subtrahend Y by executing the micro control program.

In this case, as shown in FIG. 10A, the lower half bits YD00 to YD07 are input to the lower bits 0 to 7 of the YREG 22B in synchronization with the first clock signal of the second writing cycle under the control of the control circuit 223, and the upper half bits YD08 to YD15 are input to the upper bits 8 to 15 of the YREG 22B in synchronization with the second clock signal of the second writing cycle under the control of the control circuit 223.

Next, the input data X and Y are computed in a step P4. At this time, when the data YD00 to YD07 are written in a lower order byte of the YREG 22B, arithmetic action is started, and an absolute value obtained by subtracting the input data Y from the input data X is computed by the |X−Y| computing element 221. In this case, the arithmetic operation start permitting signal S1 is output from the control circuit 223 to the |X−Y| computing element 221. As shown in FIG. 10A, the signal S1 is output to the |X−Y| computing element 221 after the lower half bits YD00 to YD07 are input to the lower bits 0 to 7 of the YREG 22B and the input of the lower half bits is finished. In other words, the signal S1 is output to the |X−Y| computing element 221 in synchronization with a leading edge of the second clock of the second writing cycle. A time required for the arithmetic processing of the |X−Y| computing element 221 is very much shorter than a data transfer period of time. For example, the time required for the arithmetic processing is almost equal to a gate delaying time. Further, the operation values thereof are accumulated by means of the Σ computing element 222. In this case, the arithmetic operation start permitting signal S2 is input from the control circuit 223 to the Σ computing element 222. As shown in FIG. 10A, the signal S2 rises when the arithmetic processing of the |X−Y| computing element 221 is finished. In the Σ computing element 222, when the signal S2 is received, the arithmetic resulting data currently obtained in the |X−Y| computing element 221 and the arithmetic resulting data which is obtained in the previous cycle and is stored in the OREG 22D are added to each other. Here, when the operation contents of the address value #5555H include alteration of the values of the input data X and Y, the process is returned to the step P2 and the data of the XREG 22A are rewritten.

Then, the data of the YREG 22B are rewritten in the step P3. The data of the XREG 22A is rewritten in the first writing cycle, and the data of the YREG 22B is rewritten in the second writing cycle. In this case, there is a case that the arithmetic processing is continued by using the arithmetic resulting data for the input data X or Y. Thereafter, the operation is repeated by the portion of the number of preset terms. Further, the value of the input data X is fixed in the operation contents of the address value #5555H. Here, when alteration of only the value of the input data Y is included, the process is returned to the step P3, only the data of the YREG 22B are rewritten, and the operation is repeated by the portion of the number of preset terms. The previous data of the XREG 22A is maintained in the first writing cycle as the current data, and the data of the YREG 22B is rewritten in the second writing cycle. The reason is because there is a case that the input data X is fixed in a proportional calculation or the like and the arithmetic processing is performed. The lower half bits OD00 to OD07 of the resulting data O are stored in the bits 0 to 7 of the OREG 22D, and the upper half bits OD08 to OD15 thereof are stored in the bits 8 to 15.

Thereafter, the resulting data O having 16 bits are transferred in the read cycle of the OREG 22D. At this time, the lower half bits OD00 to OD07 of the resulting data O are read out of the bits 0 to 7 of the OREG 22D by designating the lower order address "000084H" in the OREG 22D, and the upper half bits OD08 to OD15 thereof are read out of the bits 8 to 15 by designating the upper order address "000085H". In this case, as shown in FIG. 10A, the lower half bits XD00 to XD07 are output from the lower bits 0 to 7 of the OREG 22D in synchronization with the first clock signal of the reading cycle under the control of the control circuit 223, and the upper half bits XD08 to XD15 are output from the upper bits 8 to 15 of the OREG 22D in synchronization with the second clock signal of the reading cycle under the control of the control circuit 223. Besides, when the resulting data O overflows, an overflow flag (COVF) is set. At this time, the OREG 22D is cleared by the RCLR bit or reset of the AFCS 224.

The overflow flag is set when the resulting data O exceed 16 bits midway in the operation, thus making it possible to generate an interrupt request by setting this overflow flag. Further, it is impossible to generate an interrupt request upon termination of the operation.

Thus, according to the method of computing data related to the first embodiment of the present invention, as shown in the action time chart in FIG. 10A, the input data X are supplied to the XREG 22A in the first write cycle, and thereafter, the input data Y are supplied to the YREG 22B in the second write cycle, and the input data X and Y are computed.

In detail, the lower half bits YD00 to YD07 of the input data Y are input to the YREG 22B in the second writing cycle, and the arithmetic processing is started in the |X–Y| computing element 221 in which the arithmetic operation start permitting signal S1 is received after the input of the lower half bits of the input data Y is finished. Therefore, the arithmetic processing is performed and finished during a data transfer processing period of time in which the data XD00 to XD15 are input to the XREG 22A, the data YD00 to YD15 are input to the YREG 22B and the data OD00 to OD15 are read out from the OREG 22D. Accordingly, because it is not required to additionally arrange an arithmetic stage in a pipeline processing, any calculating time is not required in any arithmetic stage, and the data processing can be performed at a higher speed.

As a result, as shown in FIG. 7A and FIG. 7B, when the addresses of respective XREG 22A, YREG 22B and OREG 22D are assigned efficiently and it is controlled so that the operation is started upon receipt of the transfer of the input data Y by the second write cycle so as to transfer the input data X and Y to the computing element 22C at a high speed by software or hardware, it is possible to have the computing element 22C perform the operation independently of the CPU 21. With this, the resulting data O are transferred from the OREG 22D to the general-use RAM 26 or the like in the read cycle.

With the foregoing, it is not required to transfer the input data X and Y to an exclusive data region of the computing element 4A as included in the prior art of the present invention in advance before the operation and develop them there. Further, since the operation is started after receiving the transfer of the input data Y, it is possible to set the total data processing period of time to the data transfer period of time (6 cycles), and the operation is terminated until the OREG 22D is read. Accordingly, because the arithmetic processing is performed during the six cycles comprising the first and second writing cycles and the reading cycles, an additional time for the arithmetic processing performed within a time required for the data transfer processing is not required. Accordingly, because it is not required to additionally arrange an arithmetic stage in a pipeline processing, and arrange a storing stage for the input data X, a storing stage for the input data Y and an outputting stage for the arithmetic resulting data O are sufficient to perform the pipeline processing.

Besides, when the operation period of time is shorter than the execution period of time of the CPU 21, it is not necessary to pay attention to the period of time until the termination of the operation. Namely, when the operation period of time is equal to or shorter than the transfer instruction, it is possible to obtain required resulting data O without considering the operation period of time. The flag for confirmation of termination becomes unnecessary.

Further, even when the arithmetic expression of the computing element 22C becomes complicated, the number of programs of the software is for the transfer of the input data X in the first write cycle (2 cycles), the transfer of the input data Y in the second write cycle (2 cycles), the transfer of the resulting data O in the read cycle (2 cycles) and so on, thus making it possible to set the number of control programs thereof equivalent to one another.

Since the arithmetic action is started by data transfer only with the above, it is possible to perform arithmetic processing irrespective of the number of operation terms, and the degree of freedom (flexibility) of the number of operation terms is increased. Further, it also becomes possible to cope simply with a case when the number of operation terms at the memory capacity of the RAM for operation data or more is produced. With this, it becomes possible to correspond to diversified operation uses by alteration of the computing element 22C only.

With this, dependency on the performance of the DMAC or the like as in the prior art of the present invention disappears, and the total data processing period of time becomes to depend on the data transfer period of time by the first and the second write cycles and the read cycle. With this, it becomes possible to improve achievement of a high speed of the data processing speed by a large margin as compared with the prior art of the present invention. Further, it becomes possible to aim at reducing the processing period of time by a large margin and to aim at achieving a high speed of data processing.

(2) Description of the second preferred embodiment

Figure 11:
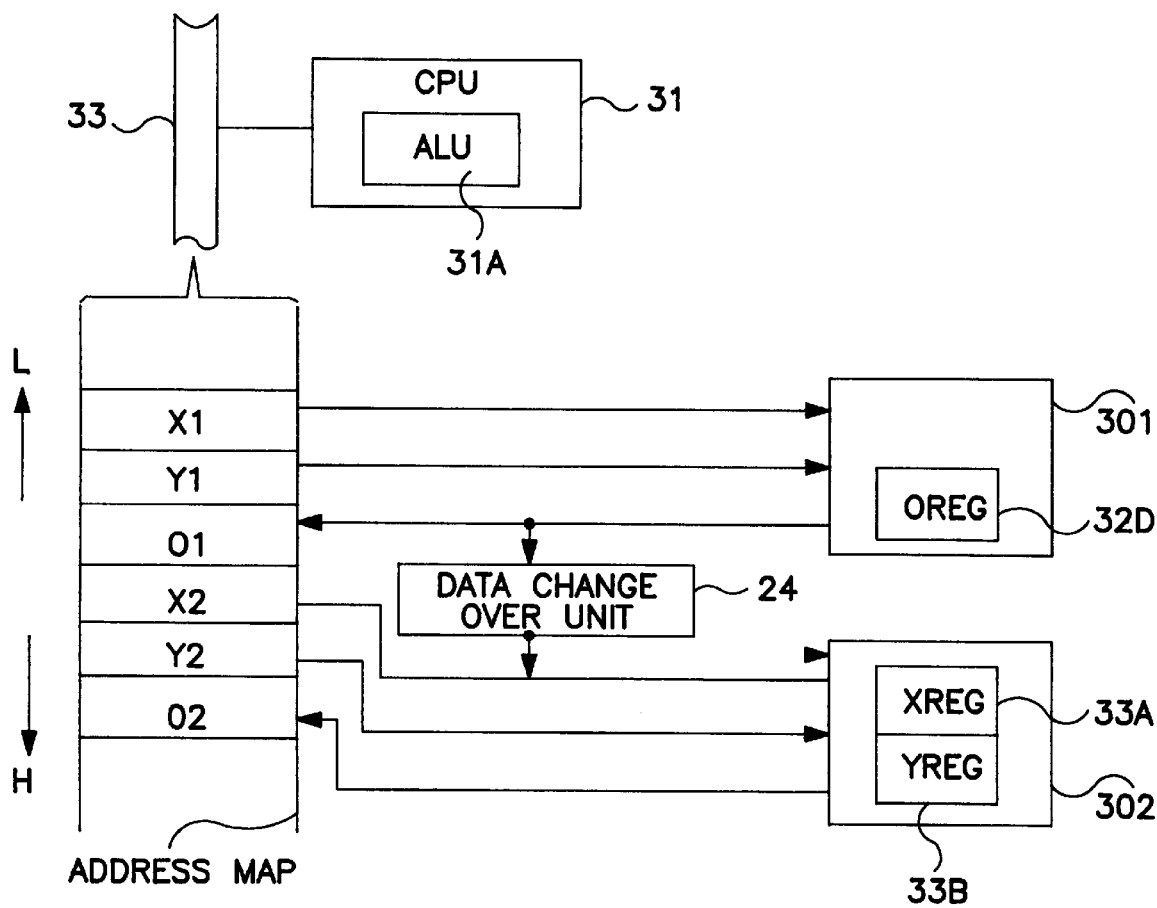
FIG. 11 is an explanatory diagram of a data processor according to a second preferred embodiment of the present invention.

What differs from the first embodiment to a second preferred embodiment which is shown in FIG. 11 is a fact that there are provided two auxiliary arithmetic units 301 and 302 along a bus 33 connected to a CPU 31 and normal parallel data processing and pipeline arithmetic processing are performed by changing over from and to each other.

Namely, a second data processor of the present invention includes auxiliary arithmetic units 301 and 302 and a data change-over portion 24 as shown in FIG. 11. The auxiliary arithmetic units 301 and 302 each comprise an auxiliary arithmetic unit 22 according to the second embodiment of the present invention. Further, the address mapping of a register according to the embodiment of the present invention is such that input data X1 and Y1, resulting data O1, input data X2 and Y2 and resulting data O2 are assigned between a lower half bits L region and an upper half bits H region of an address map.

The data change-over portion 24 is an example of the data change-over means 14, and, for example, changes over "whether a register value of the address map is used" or "whether the resulting data O1 of the auxiliary arithmetic unit 301 are used" from each other with respect to the input data X2 of the auxiliary arithmetic unit 302. Namely, the data change-over portion 24 is connected between an OREG 33D of the auxiliary arithmetic unit 301 and an XREG 33A of the auxiliary arithmetic unit 302. Besides, the data change-over portion 24 may be connected between the OREG 33D of the auxiliary arithmetic unit 301 and the YREG 33B of the auxiliary arithmetic unit 302 depending on the micro control program.

Here, the operation of the second data processor of the present invention will be described. For example, in FIG. 11, the data change-over portion 24 connected between two auxiliary arithmetic units 301 and 302 is controlled. Namely, the resulting data O1 held in the OREG 33D of the auxiliary arithmetic unit 301 are now supplied to the XREG 33A or the YREG 33B of the auxiliary arithmetic unit 302, and the resulting data O1 are now transferred to another general-use RAM or the like by change-over control. With this, the operation is executed by selecting either normal parallel data processing or pipeline operation processing.

Thus, in the data processor according to the second embodiment of the present invention, two auxiliary arithmetic units 301 and 302 are connected to the bus 33 of the CPU 31 as shown in FIG. 11. Further, the data change-over portion 24 is connected between the OREG 33D of the auxiliary arithmetic unit 301 and the XREG 33A of the auxiliary arithmetic unit 302.

As a result, it is possible to perform parallel auxiliary operation with respect to an ALU 31A of the CPU 31. For example, the resulting data O1 based on operation support processing by the auxiliary arithmetic unit 301 are used for input data X2 or input data Y2 of the other auxiliary arithmetic unit 302 so as to perform pipeline operation processing. With this, it is possible to perform parallel support operation at a high speed for the ALU 31A of the CPU 31, and it becomes possible to cope with diversified operation uses by modification of the computing element 33C only.

Further, it becomes possible to aim at improvement of operational function and high speed action of the data processor concerned.

What is claimed is:

1. A data processor having first and second writing cycles and a reading cycle, comprising:

first storing means for storing first set data;

second storing means for storing second set data;

arithmetic means for performing an arithmetic operation by using the first set data stored in the first storing means and the second set data stored in the second storing means;

third storing means for storing arithmetic resulting data obtained in the arithmetic means; and control means for inputting and storing a lower half portion of the first set data in the first storing means in synchronization with a first clock of the first writing cycle, inputting and storing an upper half portion of the first set data in the first storing means in synchronization with a second clock of the first writing cycle, inputting and storing a lower half portion of the second set data Y in the second storing means in synchronization with a first clock of the second writing cycle, inputting and storing an upper half portion of the second set data in the second storing means in synchronization with a second clock of the second writing cycle, inputting the lower half portion of the first set data stored in the first storing means and the lower half portion of the second set data stored in the second storing means to the arithmetic means bit by bit in the order from least significant bits of the first and second set data to upper bits in synchronization with the second clock of the second writing cycle, performing an arithmetic operation in the arithmetic means by using a bit of the lower half portion of the first set data and a corresponding bit of the lower half portion of the second set data each time one bit of the lower half portion of the first set data and one bit of the lower half portion of the second set data are input to the arithmetic means in synchronization with each other, storing each bit of a lower half portion of the arithmetic resulting data obtained as a result of the arithmetic operation in the third storing means in the order in which bits of the arithmetic resulting data are obtained, outputting the lower half portion of the arithmetic resulting data from the third storing means in synchronization with a first clock of the reading cycle, inputting the upper half portion of the first set data stored in the first storing means and the upper half portion of the second set data stored in the second storing means to the arithmetic means bit by bit in the order from least significant bits of the first and second set data to upper bits in synchronization with the first clock of the reading cycle, performing an arithmetic operation in the arithmetic means by using a bit of the upper half portion of the first set data and a bit of the upper half portion of the second set data each time one bit of the upper half portion of the first set data and one bit of the upper half portion of the second set data are input to the arithmetic means in synchronization with each other, storing each bit of an upper half portion of the arithmetic resulting data obtained as a result of the arithmetic operation in the third storing means in the order in which bits of the arithmetic resulting data are obtained, and outputting the upper half portion of the arithmetic resulting data from the third storing means in synchronization with a second clock of the reading cycle.

2. A data processor according to claim 1, further comprising:

a memory region for successively arranging a first address to which the first set data input to the first storing means is assigned, a second address to which the second set data input to the second storing means is assigned and a third address to which the arithmetic resulting data output from the third storing means is assigned.

3. A data processor according to claim 1, further comprising:

a memory region for arranging a first plurality of addresses to which a plurality of pieces of the first set data input to the first storing means are assigned in a first group, arranging a second plurality of addresses to which a plurality of pieces of second set data input to the second storing means are assigned in a second group, arranging a third plurality of addresses to which a plurality of pieces of arithmetic resulting data output from the third storing means are assigned in a third group, and arranging the first through third groups of addresses in succession.

4. A data processor having first and second writing cycles and a reading cycle, comprising:

(a) data control means having a computing portion; and (b) supporting means for supporting the computing portion of the data control means, the supporting means comprising first storing means for storing first set data, second storing means for storing second set data, arithmetic means for performing an arithmetic operation by using the first set data stored in the first storing means and the second set data stored in the second storing means, third storing means for storing arithmetic resulting data obtained in the arithmetic means, and control means for inputting and storing a lower half portion of the first set data in the first storing means in synchronization with a first clock of the first writing cycle, inputting and storing an upper half portion of the first set data in the first storing means in synchronization with a second clock of the first writing cycle, inputting and storing a lower half portion of the second set data Y in the second storing means in synchronization with a first clock of the second writing cycle, inputting and storing an upper half portion of the second set data in the second storing means in synchronization with a second clock of the second writing cycle, inputting the lower half portion of the first set data stored in the first storing means and the lower half portion of the second set data stored in the second storing means to the arithmetic means bit by bit in the order from least significant bits of the first and second set data to upper bits in synchronization with the second clock of the second writing cycle, performing an arithmetic operation in the arithmetic means by using a bit of the lower half portion of the first set data and a corresponding bit of the lower half portion of the second set data each time one bit of the lower half portion of the first set data and one bit of the lower half portion of the second set data are input to the arithmetic means in synchronization with each other, storing each bit of a lower half portion of the arithmetic resulting data obtained as a result of the arithmetic operation in the third storing means in the order in which bits of the arithmetic resulting data are obtained, outputting the lower half portion of the arithmetic resulting data from the third storing means in synchronization with a first clock of the reading cycle, inputting the upper half portion of the first set data stored in the first storing means and the upper half portion of the second set data stored in the second storing means to the arithmetic means bit by bit in the order from least significant bits of the first and second set data to upper bits in synchronization with the first clock of the reading cycle, performing an arithmetic operation in the arithmetic means by using a bit of the upper half portion of the first set data and a bit of the upper half portion of the second set data each time one bit of the upper half portion of the first set data and one bit of the upper half portion of the second set data are input to the arithmetic means in synchronization with each other, storing each bit of an upper half portion of the arithmetic resulting data obtained as a result of the arithmetic operation in the third storing means in the order in which bits of the arithmetic resulting data are obtained, and outputting the upper half portion of the arithmetic resulting data from the third storing means in synchronization with a second clock of the reading cycle.

5. A data processor according to claim 4, further comprising:
a memory region for successively arranging a first address to which the first set data input to the first storing means is assigned, a second address to which the second set data input to the second storing means is assigned and a third address to which the arithmetic resulting data output from the third storing means is assigned.

6. A data processor according to claim 4, further comprising:
a memory region for arranging a first plurality of addresses to which a plurality of pieces of the first set data input to the first storing means are assigned in a first group, arranging a second plurality of addresses to which a plurality of pieces of second set data input to the second storing means are assigned in a second group, arranging a third plurality of addresses to which a plurality of pieces of arithmetic resulting data output from the third storing means are assigned in a third group, and arranging the first through third groups of addresses in succession.

7. A data processor having first and second writing cycles and a reading cycle, comprising:
(a) data control means having a computing portion;
(b) a plurality of supporting means for respectively supporting the computing portion of the data control means, each of the supporting means comprising:
first storing means for storing first set data,
second storing means for storing second set data,
arithmetic means for performing an arithmetic operation by using the first set data stored in the first storing means and the second set data stored in the second storing means,
third storing means for storing arithmetic resulting data obtained in the arithmetic means, and
control means for inputting and storing a lower half portion of the first set data in the first storing means in synchronization with a first clock of the first writing cycle, inputting and storing an upper half portion of the first set data in the first storing means in synchronization with a second clock of the first writing cycle, inputting and storing a lower half portion of the second set data Y in the second storing means in synchronization with a first clock of the second writing cycle, inputting and storing an upper half portion of the second set data in the second storing means in synchronization with a second clock of the second writing cycle, inputting the lower half portion of the first set data stored in the first storing means and the lower half portion of the second set data stored in the second storing means to the arithmetic means bit by bit in the order from least significant bits of the first and second set data to upper bits in synchronization with the second clock of the second writing cycle, performing an arithmetic operation in the arithmetic means by using a bit of the lower half portion of the first set data and a corresponding bit of the lower half portion of the second set data each time one bit of the lower half portion of the first set data and one bit of the lower half portion of the second set data are input to the arithmetic means in synchronization with each other, storing each bit of a lower half portion of the arithmetic resulting data obtained as a result of the arithmetic operation in the third storing means in the order in which bits of the arithmetic resulting data are obtained, outputting the lower half portion of the arithmetic resulting data from the third storing means in synchronization with a first clock of the reading cycle, inputting the upper half portion of the first set data stored in the first storing means and the upper half portion of the second set data stored in the second storing means to the arithmetic means bit by bit in the order from least significant bits of the first and second set data to upper bits in synchronization with the first clock of the reading cycle, performing an arithmetic operation in the arithmetic means by using a bit of the upper half portion of the first set data and a bit of the upper half portion of the second set data each time one bit of the upper half portion of the first set data and one bit of the upper half portion of the second set data are input to the arithmetic means in synchronization with each other, storing each bit of an upper half portion of the arithmetic resulting data obtained as a result of the arithmetic operation in the third storing means in the order in which bits of the arithmetic resulting data are obtained, and outputting the upper half portion of the arithmetic resulting data from the third storing means in synchronization with a second clock of the reading cycle; and
(c) data change-over means for transferring the arithmetic resulting data output from one of the supporting means to one of another one of the supporting means and the data control means.

8. A data processor according to claim 7, further comprising:
a memory region for successively arranging a first address to which the first set data input to the first storing means is assigned, a second address to which the second set data input to the second storing means is assigned and a third address to which the arithmetic resulting data output from the third storing means is assigned.

9. A data processor according to claim 7, further comprising:

a memory region for arranging a first plurality of addresses to which a plurality of pieces of the first set data input to the first storing means are assigned in a first group, arranging a second plurality of addresses to which a plurality of pieces of second set data input to the second storing means are assigned in a second group, arranging a third plurality of addresses to which a plurality of pieces of arithmetic resulting data output from the third storing means are assigned in a third group, and arranging the first through third groups of addresses in succession.

10. A data processor according to claim 7, wherein the arithmetic resulting data output from the third storing means of one of the supporting means is used as one of the first set data input to the first storing means of another supporting means and the second set data input to the second storing means of another supporting means, and a pipeline processing is performed by the two supporting means.

* * * * *